United States Patent
Cha et al.

(10) Patent No.: US 12,339,381 B2
(45) Date of Patent: Jun. 24, 2025

(54) ENHANCING POSITIONING MEASUREMENT

(71) Applicant: Nokia Technologies Oy, Espoo (FI)

(72) Inventors: Hyun-Su Cha, Chicago, IL (US); Ryan Keating, Chicago, IL (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 18/925,500

(22) Filed: Oct. 24, 2024

(65) Prior Publication Data

US 2025/0067883 A1    Feb. 27, 2025

Related U.S. Application Data

(63) Continuation of application No. PCT/EP2023/059088, filed on Apr. 6, 2023.

(51) Int. Cl.
  *G01S 19/41* (2010.01)
  *G01S 19/43* (2010.01)

(52) U.S. Cl.
  CPC .............. *G01S 19/41* (2013.01); *G01S 19/43* (2013.01)

(58) Field of Classification Search
  CPC ............ H04W 64/00; H04W 56/0015; H04W 56/001; H04W 64/003; G01S 19/44; G01S 19/43; G01S 19/45; G01S 19/41
  See application file for complete search history.

(56) References Cited

U.S. PATENT DOCUMENTS

| | | | |
|---|---|---|---|
| 2022/0381922 A1* | 12/2022 | Ren | G01S 19/31 |
| 2023/0098682 A1* | 3/2023 | Bao | G01S 5/0236 |
| | | | 455/456.1 |

FOREIGN PATENT DOCUMENTS

| | | | | |
|---|---|---|---|---|
| CN | 112147663 A | * | 12/2020 | |
| CN | 115767415 A | | 3/2023 | |
| CN | 111801595 B | * | 6/2024 | G01S 19/07 |
| EP | 3910364 A1 | * | 11/2021 | G01S 5/0205 |
| KR | 102263393 B1 | * | 6/2021 | |
| TW | 202112107 A | * | 3/2021 | H04L 27/2655 |
| WO | 2023056152 A1 | | 4/2023 | |

OTHER PUBLICATIONS

PCT International Search Report (PCT/EP2023/059088)—Aug. 14, 2023 (6 pgs).

(Continued)

*Primary Examiner* — Dung Hong
(74) *Attorney, Agent, or Firm* — Lippes Mathias LLP

(57) ABSTRACT

An apparatus, for example a target UE, may be configured to: request at least one single difference carrier phase measurement of at least one positioning reference signal, wherein the at least one single difference carrier phase measurement is performed with at least one positioning reference unit; transmit an indication of a set of time-stamps for measurement of the at least one positioning reference signal; receive first measurement data for the at least one positioning reference signal, wherein the first measurement data comprises, at least, the at least one single difference carrier phase measurement measured with reference to the set of time-stamps; and determine a location estimation of the apparatus, comprising performing a double differential operation based, at least partially, on the first measurement data and second measurement data.

13 Claims, 5 Drawing Sheets

(56) References Cited

OTHER PUBLICATIONS

PCT Written Opinion (PCT/EP2023/059088)—Aug. 14, 2023 (19 pgs).
M. Säily, O. N. C. Yilmaz, D. S. Michalopoulos, E. Pérez, R. Keating and J. Schaepperle, "Positioning Technology Trends and Solutions Toward 6G," 2021 IEEE 32nd Annual International Symposium on Personal, Indoor and Mobile Radio Communications (PIMRC), Helsinki, Finland, 2021, pp. 1-7, doi: 10.1109/PIMRC50174.2021.9569341.

* cited by examiner

300

310: request at least one single difference carrier phase measurement of at least one positioning reference signal, wherein the at least one single difference carrier phase measurement is performed with at least one positioning reference unit

320: transmit an indication of a set of time-stamps for measurement of the at least one positioning reference signal

330: receive first measurement data for the at least one positioning reference signal, wherein the first measurement data comprises, at least, the at least one single difference carrier phase measurement measured with reference to the set of time-stamps

340: determine a location estimation of the apparatus, comprising performing a double differential operation based, at least partially, on the first measurement data and second measurement data

410 — receive, from a target user equipment, a first request for at least one single difference carrier phase measurement of at least one positioning reference signal, wherein the first request is associated with at least one positioning reference unit

420 — receive, from the target user equipment, a first indication of a set of time-stamps for measurement of the at least one positioning reference signal

430 — transmit, to the at least one positioning reference unit, a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier

440 — receive, from the at least one positioning reference unit, at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps

450 — transmit the at least one of the previous measurements and/or the measurement data to the target user equipment

510 receive a request for at least one single difference carrier phase measurement of at least one positioning reference signal

520 receive an indication of a set of time-stamps for the single difference carrier phase measurement of the at least one positioning reference signal

530 perform measurement of the at least one positioning reference signal, with reference to the set of time-stamps, to determine single difference carrier phase measurement(s) of the at least one positioning reference signal based, at least partially, on the at least one requested single difference carrier phase measurement

540 transmit a message, wherein the transmitted message is based, at least partially, on the determined single difference carrier phase measurement(s) of the at least one positioning reference signal

FIG. 5

ENHANCING POSITIONING MEASUREMENT

This application is a continuation application of International Application No. PCT/EP2023/059088, filed Apr. 6, 2023, which in turn claims priority to Finnish Application No. FI 20225353 filed Apr. 27, 2022, the contents of which are all hereby incorporated by reference herein in their entirety.

TECHNICAL FIELD

The example and non-limiting embodiments relate generally to positioning and, more particularly, to user of a positioning reference unit to perform measurement for positioning.

BACKGROUND

It is known, in UE based positioning, to perform positioning using carrier phase measurements.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: request at least one single difference carrier phase measurement of at least one positioning reference signal, wherein the at least one single difference carrier phase measurement is performed with at least one positioning reference unit; transmit an indication of a set of time-stamps for measurement of the at least one positioning reference signal; receive first measurement data for the at least one positioning reference signal, wherein the first measurement data comprises, at least, the at least one single difference carrier phase measurement measured with reference to the set of time-stamps; and determine a location estimation of the apparatus, comprising performing a double differential operation based, at least partially, on the first measurement data and second measurement data.

In accordance with one aspect, an apparatus comprising means for performing: requesting at least one single difference carrier phase measurement of at least one positioning reference signal, wherein the at least one single difference carrier phase measurement is performed with at least one positioning reference unit; transmitting an indication of a set of time-stamps for measurement of the at least one positioning reference signal; receiving first measurement data for the at least one positioning reference signal, wherein the first measurement data comprises, at least, the at least one single difference carrier phase measurement measured with reference to the set of time-stamps; and determining a location estimation of the apparatus, comprising performing a double differential operation based, at least partially, on the first measurement data and second measurement data.

In accordance with one aspect, a method comprising: requesting at least one single difference carrier phase measurement of at least one positioning reference signal, wherein the at least one single difference carrier phase measurement is performed with at least one positioning reference unit; transmitting an indication of a set of time-stamps for measurement of the at least one positioning reference signal; receiving first measurement data for the at least one positioning reference signal, wherein the first measurement data comprises, at least, the at least one single difference carrier phase measurement measured with reference to the set of time-stamps; and determining a location estimation of the apparatus, comprising performing a double differential operation based, at least partially, on the first measurement data and second measurement data.

In accordance with one aspect, a non-transitory computer-readable medium comprising program instructions stored thereon which, when executed with at least one processor, cause the at least one processor to: request at least one single difference carrier phase measurement of at least one positioning reference signal, wherein the at least one single difference carrier phase measurement is performed with at least one positioning reference unit; cause transmitting of an indication of a set of time-stamps for measurement of the at least one positioning reference signal; cause receiving of first measurement data for the at least one positioning reference signal, wherein the first measurement data comprises, at least, the at least one single difference carrier phase measurement measured with reference to the set of time-stamps; and determine a location estimation of the apparatus, comprising performing a double differential operation based, at least partially, on the first measurement data and second measurement data.

In accordance with one aspect, an apparatus comprising: at least one processor; and at least one memory including computer program code; the at least one memory and the computer program code configured to, with the at least one processor, cause the apparatus at least to: receive, from a target user equipment, a first request for at least one single difference carrier phase measurement of at least one positioning reference signal, wherein the first request is associated with at least one positioning reference unit; receive, from the target user equipment, a first indication of a set of time-stamps for measurement of the at least one positioning reference signal; transmit, to the at least one positioning reference unit, a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receive, from the at least one positioning reference unit, at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps; and transmit the at least one of the previous measurements and/or the measurement data to the target user equipment.

In accordance with one aspect, an apparatus comprising means for performing: receiving, from a target user equipment, a first request for at least one single difference carrier phase measurement of at least one positioning reference signal, wherein the first request is associated with at least one positioning reference unit; receiving, from the target user equipment, a first indication of a set of time-stamps for measurement of the at least one positioning reference signal; transmitting, to the at least one positioning reference unit, a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receiving, from the at least one positioning reference unit, at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps; and transmitting the at least one of the previous measurements and/or the measurement data to the target user equipment.

In accordance with one aspect, a method comprising: receiving, from a target user equipment, a first request for at least one single difference carrier phase measurement of at least one positioning reference signal, wherein the first request is associated with at least one positioning reference unit; receiving, from the target user equipment, a first indication of a set of time-stamps for measurement of the at least one positioning reference signal; transmitting, to the at least one positioning reference unit, a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receiving, from the at least one positioning reference unit, at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps; and transmitting the at least one of the previous measurements and/or the measurement data to the target user equipment.

In accordance with one aspect, a non-transitory computer-readable medium comprising program instructions stored thereon which, when executed with at least one processor, cause the at least one processor to: cause receiving, from a target user equipment, of a first request for at least one single difference carrier phase measurement of at least one positioning reference signal, wherein the first request is associated with at least one positioning reference unit; cause receiving, from the target user equipment, of a first indication of a set of time-stamps for measurement of the at least one positioning reference signal; cause transmitting, to the at least one positioning reference unit, of a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; cause receiving, from the at least one positioning reference signal, of at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps; and cause transmitting of the at least one of the previous measurements and/or the measurement data to the target user equipment.

In accordance with one aspect, an apparatus comprising: at least one processor; and at least one memory including computer program code; the at least one memory and the computer program code configured to, with the at least one processor, cause the apparatus at least to: receive a request for at least one single difference carrier phase measurement of at least one positioning reference signal; receive an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and transmit a message, wherein the transmitted message is based, at least partially, on the determined single difference carrier phase measurement(s) of the at least one positioning reference signal.

In accordance with one aspect, an apparatus comprising means for performing: receiving a request for at least one single difference carrier phase measurement of at least one positioning reference signal; receiving an indication of a set of time-stamps for measurement of the at least one positioning reference signal; performing measurement of the at least one positioning reference signal, with reference to the set of time-stamps, to determine single difference carrier phase measurement(s) of the at least one positioning reference signal based, at least partially, on the at least one requested single difference carrier phase measurement; and transmitting a message, wherein the transmitted message is based, at least partially, on the determined single difference carrier phase measurement(s) of the at least one positioning reference signal.

In accordance with one aspect, a method comprising: receiving a request for at least one single difference carrier phase measurement of at least one positioning reference signal; receiving an indication of a set of time-stamps for measurement of the at least one positioning reference signal; performing measurement of the at least one positioning reference signal, with reference to the set of time-stamps, to determine single difference carrier phase measurement(s) of the at least one positioning reference signal based, at least partially, on the at least one requested single difference carrier phase measurement; and transmitting a message, wherein the transmitted message is based, at least partially, on the determined single difference carrier phase measurement(s) of the at least one positioning reference signal.

In accordance with one aspect, a non-transitory computer-readable medium comprising program instructions stored thereon which, when executed with at least one processor, cause the at least one processor to: cause receiving of a request for at least one single difference carrier phase measurement of at least one positioning reference signal; cause receiving of an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and cause transmitting of a message, wherein the transmitted message is based, at least partially, on the determined single difference carrier phase measurement(s) of the at least one positioning reference signal.

BRIEF DESCRIPTION OF THE DRAWINGS

The foregoing aspects and other features are explained in the following description, taken in connection with the accompanying drawings, wherein:

FIG. 3 is a flowchart illustrating steps as described herein;

FIG. 4 is a flowchart illustrating steps as described herein; and

FIG. 5 is a flowchart illustrating steps as described herein.

DETAILED DESCRIPTION OF EMBODIMENTS

Figure 1:
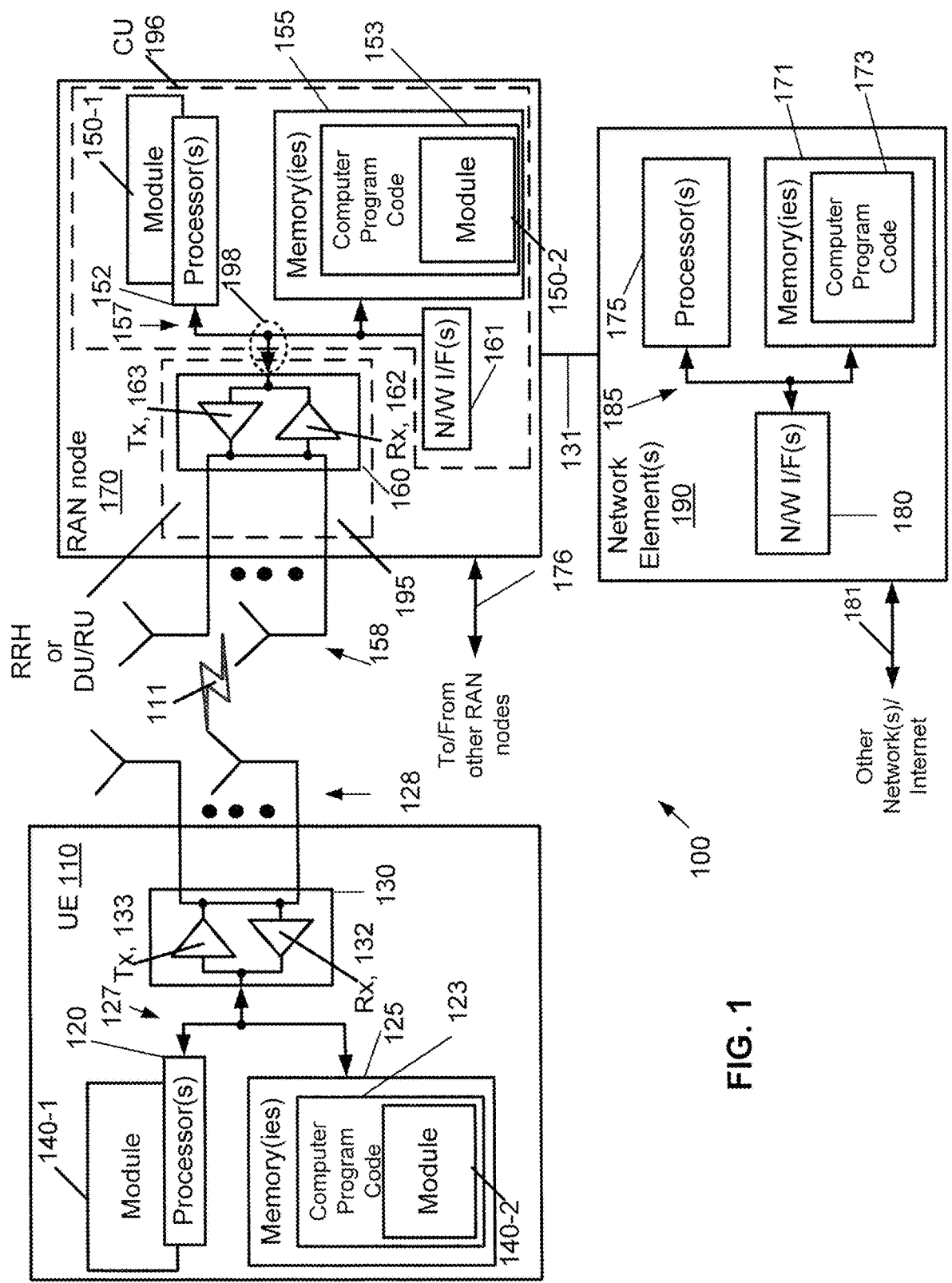
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
AoA angle of arrival
AoD angle of departure
CP carrier phase
CU central unit
D2D device-to-deice
DL downlink
DU distributed unit
ECID enhanced cell ID
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
GNSS Global Navigation Satellite System
I/F interface
L1 layer 1
LMF location management function
LOS line of sight
LPHAP Low Power High Accuracy Positioning
LPP LTE positioning protocol
LTE long term evolution
MAC medium access control
MME mobility management entity
ng or NG new generation
ng-eNB or NG-eNB new generation Enb
NLoS non-line of sight
NR new radio
NRPPa NR positioning protocol a
N/W or NW network
PDCP packet data convergence protocol
PHY physical layer
ProSe proximity service
PRS positioning reference signal
PRU positioning reference unit
RAN radio access network
RAT radio access technology
RF radio frequency
RLC radio link control
RRC radio resource control
RRH remote radio head
RS reference signal
RSRP reference signal received power
RSTD reference signal time difference
RToA relative time of arrival
RTT round trip time
RU radio unit
Rx receiver
SDAP service data adaptation protocol
SGW serving gateway SL sidelink
SMF session management function
SRS sounding reference signal
TDOA time difference of arrival
TEG timing error group
ToA time of arrival
TRP transmission reception point
Tx transmitter
UE user equipment (e.g., a wireless, typically mobile device)
UL uplink
UPF user plane function
V2X vehicle-to-everything Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the PAN node 170 and centralized elements of the PAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The PAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the PAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the PAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function (s) (AMFF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The PAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, PAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to NR positioning, including but not limited to carrier phase positioning. More specifically, features as described herein may relate to accuracy enhancement of NR positioning. More specifically, features as described herein may relate to carrier positioning based on NR carrier phase measurements.

3GPP RAN1 work items included positioning support for NR system (RP-213561, "New SID on Study on expanded and improved NR positioning"). As a result of the work item, the following positioning techniques were specified for Rel-16 NR positioning: Downlink Time Difference of Arrival (DL-TDOA); Uplink Time Difference of Arrival (UL-TDOA); Downlink Angle of Departure (DL-AoD); Uplink Angle of Arrival (UL-AoA); and Multi-cell Round Trip Time (Multi-RTT). It may be noted that, in Rel-16/17 NR positioning, DL-TDOA, Multi-RTT, DL-AoD, DL-AoA and ECID (Enhanced Cell ID) techniques have been introduced. It may be noted that the current NR positioning specification does not support a carrier phase positioning method.

Rel-17 NR positioning has provided enhancements to these techniques, but further enhancement of accuracy has been demanded, and so accuracy enhancement was included in the Rel-18 SI description. Carrier Phase (CP) positioning technique is a strong candidate for the accuracy enhancement, as noted in RP-213561, "New SID on Study on expanded and improved NR positioning":

" . . . Improved accuracy, integrity, and power efficiency:
 Study solutions for Integrity for RAT dependent positioning techniques [RAN2, RAN1]:
  Identify the error sources, [RAN1, RAN2].
  Study methodologies, procedures, signalling, etc for determination of positioning integrity for both UE-based and UE-assisted positioning [RAN2]
  Focus on reuse of concepts and principles being developed for RAT-Independent GNSS positioning integrity, where possible.
 Study solutions for accuracy improvement based on PRS/SRS bandwidth aggregation for intra-band carriers considering e.g. timing errors, phase coherency, frequency errors, power imbalance, etc [RAN4]:
 Study solutions for accuracy improvement based on NR carrier phase measurements [RAN1, RAN4]
  Reference signals, physical layer measurements, physical layer procedures to enable positioning based on NR carrier phase measurements for both UE-based and UE-assisted positioning [RAN1]

Focus on reuse of existing PRS and SRS, with new reference signals only considered if found necessary Study the requirements on LPHAP as developed by SA1 and evaluate whether existing RAN functionality can support these power consumption and positioning requirements. Based on the evaluation, and, if found beneficial, study potential enhancements to help address any limitations [RAN2, RAN1]

Study is limited to a single representative use case (use case 6 as defined TS 22.104). The choice of selected use case can be reviewed at the start of the study.

Study is limited to enhancements to RRC INACTIVE and/or RRC_IDLE state . . . "

Example embodiments of the present disclosure may relate to enabling accuracy improvement based on NR carrier phase measurements.

In the carrier phase positioning technique, phase measurements are used to estimate location of target UEs. The UE may be able to obtain carrier phase (CP) measurement by using downlink reference signals. For example, the positioning reference signals (PRS), which were introduced in Rel-16 NR positioning, may be used, and/or another DL RS dedicated for CP measurement may be used. LMF may provide assistance data, including PRS configuration. The estimated phase measurement from the k-th UE for a positioning reference signal (PRS) resource transmitted from the i-th TRP may be denoted by:

$$\varphi_{ik} = d_{ik} \times \frac{1}{\lambda} + f(\delta_k - \delta_i) + N_{ik}$$

where $d_{ik}$ represents actual distance between the k-th UE and the i-th transmission reception point (TRP); f represents carrier frequency; $\delta_k$ represents internal clock bias at the k-th UE; $\delta_i$ represents internal clock bias at the i-th TRP; and $N_{ik}$ represents integer ambiguity of the propagated wavelength.

A similar equation may be derived for a different PRS, transmitted from the j-th TRP, such that $$\varphi_{jk} = d_{jk} \times \frac{1}{\lambda} + f(\delta_k - \delta_i) + N_{ik'}$$

and a single difference measurement may be described as in the following equation:

$$\Delta\varphi_{ij}^k = \Delta d_k \times \frac{1}{\lambda} + f\Delta\delta_{ij} + \Delta N_{ij}^k$$

where $\Delta\varphi_{ij}^k = \varphi_{ik} - \varphi_{jk}$, $\Delta d_k = d_{ik} - d_{jk}$, $\Delta\delta_{ij} = \delta_i - \delta_j$, and $\Delta N_{ij}^k = N_i - N_j$.

From this single differential operation, the clock bias from UE side ($\delta_k$) may be cancelled out, which may be similar to the reference signal time difference (RSTD) measurement of DL-TDOA. The clock error between TRPs may remain, but, in an example embodiment, it may be cancelled out with a double differential operation using measurements from and/or obtained with a (positioning) reference device, such as a reference UE.

In an example, let us assume that the K-th UE is a reference device. For the transmitted PRS from the i-th and j-th TRPs, the single difference measurement at the reference UE may be $$\Delta\varphi_{ij}^K = \Delta d_K \times \frac{1}{\lambda} + f\Delta\delta_{ij} + \Delta N_{ij}^K.$$

Using double differential operation, the double difference measurement may be:

$$\Delta\Delta\varphi_{ij}^{kK} = \Delta\Delta d_{kK} \times \frac{1}{\lambda} + \Delta\Delta N_{ij}^{kK}$$

Where $\Delta\Delta\varphi_{ij}^{kK} = \Delta\varphi_{ij}^k - \Delta\varphi_{ij}^K$, $\Delta\Delta d_{kK} = \Delta d_k - \Delta d_K$, and $\Delta\Delta N_{ij}^{kK} = \Delta N_{ij}^k - \Delta N_{ij}^K$. In the end, the clock error between TRPs may be cancelled out. We may consider clock error at the k-th UE and the TRPs, which may be the main errors to explain single difference and double difference method of carrier phase method.

In an example embodiment, a single difference carrier phase measurement may be performed by subtracting the carrier phase of one PRS (e.g. from i-th TRP) from the carrier phase of another reference PRS (e.g. from j-th TRP). In an example embodiment, a double difference carrier phase measurement may be performed by subtracting one single difference carrier phase measurement (e.g. from k-th UE) from another single difference carrier phase measurement (e.g. from K-th UE). At this point it is noted that i-th TRP and j-th TRP may refer to different TRPs, i.e. i and j may be different TRP indexes (e.g. positive integer numbers). i and j may thus be unequal (i≠j). Further, TRP-i and TRP-j may refer to different TRPs according to the given index (i.e. i or j). Similarly, k-th UE and K-th UE may refer to different UEs, i.e. k and K may be different UE indexes (e.g. positive integer numbers). k and K may thus be unequal (k≠K).

In Rel-17, whether to introduce a Positioning Reference Unit (PRU) has been discussed. PRU is a device that is capable of receiving PRS and/or transmitting SRS for positioning, and its location is accurately known to the LMF. The PRU could be UE or TRP. If the PRU is introduced in Rel-18, in an example embodiment, a double differencing method/operation may be introduced in the NR positioning system.

In the above equations, it may be noted that double differential operation might be feasible if the target UE receives the reference UE measurements from the location management function (LMF), but the TRP clock error term $\delta_i$ may not be a constant value. That is, $\delta_i(t_1) - \delta_i(t_2) = 0$ may not be guaranteed in the practical wireless network such as NR. Furthermore, the clock error may be different between different PRS resources even within a TRP, as they may be associated with different Tx Timing Error Group (TEG) IDs (which was introduced in Rel-17 NR positioning). As an example, if different PRS resources are transmitted by different TRP Tx panels, it may be likely that they are associated with different TRP Tx TEG IDs. Additionally or alternatively, the reference device might not be a single device. For Rel-18 NR positioning enhancement with carrier phase technique, in an example embodiment, we may need to consider what Rel-17 enhanced, and identify the essential feature(s) that the specification has to support.

A technical effect of implementing the double difference operation may be to support high accuracy location estimation via the CP technique. In Rel-18, example embodiments of the present disclosure may be used in order to effectively utilize the PRU and/or sidelink for UE-based positioning to support CP in NR positioning.

Example embodiments of the present disclosure may consider enhancement feature(s) of the Rel-17 positioning WI, such as Tx/Rx timing error mitigation considering TEG and line of sight (LoS)/non-line of sight (NLoS) indicator, and may also consider practical issues regarding consistency of TRP clock error bias ($\delta_i$) to produce the technical effect of supporting the double difference method for carrier phase positioning.

In an example embodiment, a procedure of requesting and signaling information between a target UE, LMF, and PRU may be enabled that includes the use of double differential operation to provide UE-based positioning. In an example embodiment the PRU may be a non-target UE, different from the target UE.

Figure 2:
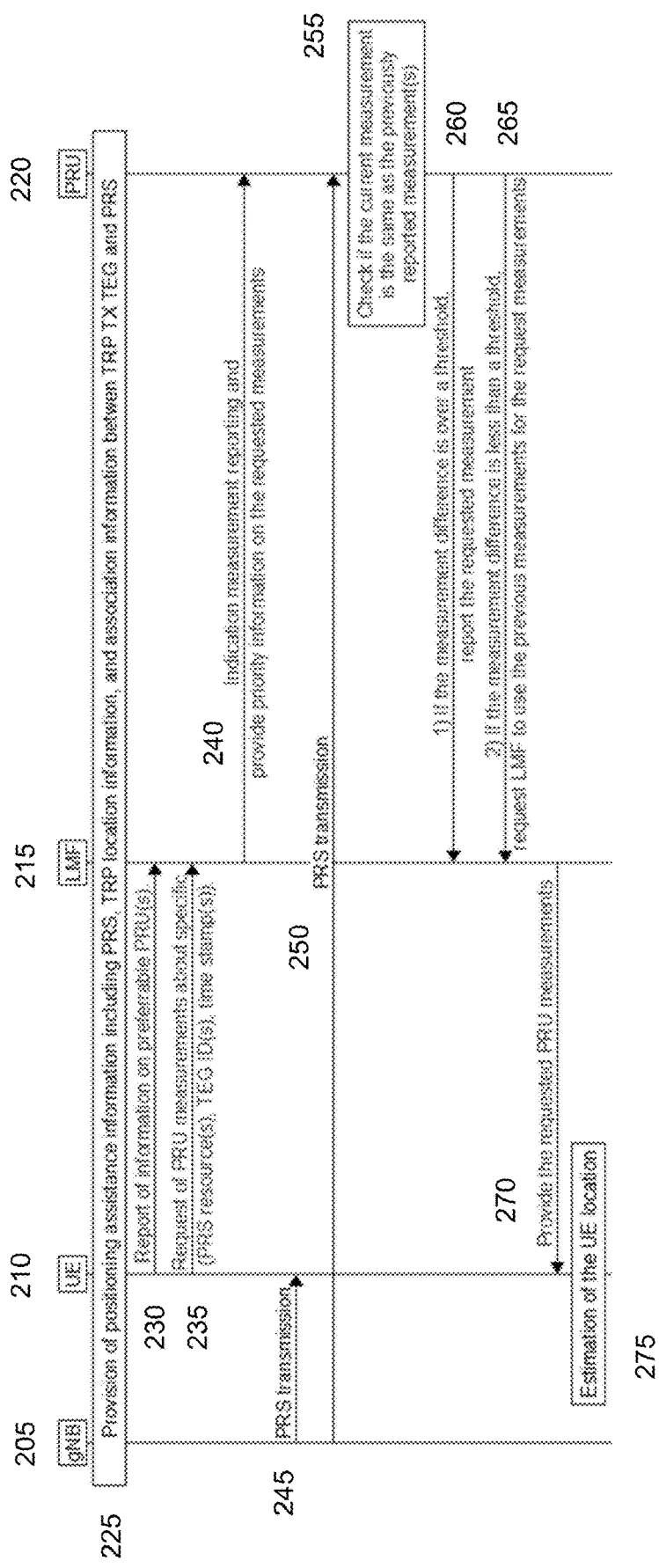
FIG. 2 is a diagram illustrating features as described herein.

Referring now to FIG. 2, illustrated is an example of signaling between a gNB (205), target UE (210), LMF (215), and PRU (220) for providing NR positioning according to example embodiments of the present disclosure. The example of FIG. 2 is not limiting; steps/messages may occur in a different order and/or simultaneously. Additionally or alternatively, different or additional entities may be involved in the signaling. For example, the LMF (215) may request information from a plurality of PRUs, and/or, for each PRU, may request information preferred/requested by multiple target UEs.

In an example embodiment, at 225, the LMF (215) may provide the UE (210) with assistance data, which may include a PRS configuration. The assistance data may additionally include TRP location information, association information between TRP Tx TEG and PRS, etc. The assistance data may additionally be provided to the gNB (205) and/or the PRU (220).

At 230, the target UE (210) may request the LMF (215) to provide additional information for double difference operation. In an example embodiment, the target UE (210) may request a report of information from a preferred PRU(s), for example PRU (220). The UE (210) may include a specific PRU ID to inform the LMF (215) that it has a preferred PRU (e.g. 220). In an example in which the UE (210) was previously provided with additional information about multiple PRUs, the UE (210) may be able to figure out/select which one is best. For example, proximity of the target UE (210) to the PRU (220) might be considered in determining/selecting which PRU to consider as preferred by the target UA (210). If the target UE (210) and certain of the PRU(s) can clearly see LoS paths from the same TRPs, or can estimate, with a high probability, the first signal/LoS path for the same TRPs, the double differential operation may be more effective; accordingly, a characteristic of the PRU (220) that may make the double differential operation more effective may cause the UE (210) to select the PRU (220) as the preferred PRU.

At 235, the target UE (210) may request the LMF (215) to provide PRU measurements of specific PRS resource(s), TEG ID(s), and/or time-stamp(s). For example, the target UE (210) may request the LMF (215) to provide measurements for the preferred PRU(s) (220) indicated/requested at 230. The request may comprise at least one single difference carrier phase measurement, which may comprises at least one of: a PRU ID, a TRP Tx TEG ID, a TRP ID, a resource set ID, a resource ID, an indication of a validity time, a priority associated with the TRP ID, a priority associated with the resource ID, and/or a priority associated with the TRP Tx TEG ID.

In an example embodiment, the target UE (210) may request the PRU's (220) carrier phase measurements for a set of, for example, TRP ID, PRS resource set ID, PRS resource ID, and/or TRP Tx TEG ID(s), and a specific set of time-stamps, points in time, or time occasions, for example, ($t_1, t_2, \ldots, t_N$)). It may be noted that the set of time-stamps may include only a single time-stamp, or a plurality of time-stamps. The set of requested time-stamps may include a specific previous or future timing aiming at location estimation of the target UE (210) at a certain future time. In an example embodiment, the target UE (210) may indicate the length of time validity of the PRU (220) measurements. In an example embodiment, the time-stamps may be PRS occasions.

The carrier phase measurements may be considered data measured, by a PRU, at the set of time-stamps. For example, at a given time-stamp $t=t_1$ of the set of time-stamps, one or multiple CP measurements may be made at or around/about $t_1$. If multiple CP measurements are made at or about $t_1$ (e.g. within a small time range around $t_1$, or within a same time slot as $t_1$), the multiple CP measurements may be averaged, which may have the technical effect of improving RS measurement quality. The averaged CP measurements may be stored and/or reported by the PRU that performed the measurements.

In an example embodiment, when the target UE (210) requests information from the LMF (215), the UE (210) may indicate priority(ies) for the requested TRP IDs and/or PRS resource IDs, since the LMF (215) may not know which measurements are preferable from UE (210) side. In an example embodiment, the PRS processing capability of PRUs (e.g. 220) may not be unlimited; accordingly, the target UE (210) and LMF (215) may consider the PRU (e.g. 220) capability. For example, the UE (210) may have prior knowledge about LoS indicator value for a TRP ID and/or a PRS resource ID, potentially based on estimation. Based on this information, the UE (210) may request PRU (220) measurement(s) with priority, for example at least one of a priority indicator, TRP ID, PRS resource ID, and/or TEG ID, and a set of time-stamps ($t_1, t_2, \ldots t_N$)).

In an example embodiment, the target UE (210) may have two separate preferences. The first one may be for a specific PRU(s), and the second one may be for a specific TRP ID(s) and PRS resource ID (s).

In an example embodiment, the location information for a PRU (220) may be specifically requested for the requested time-stamp(s). The LMF (215) may provide/forward to the UE (210) with PRU ID(s) and their coordinate information for the requested time-stamp received from the PRU (220) such as ($x_1, y_1, z_1, t_1$), . . . , ($x_N, y_N, z_N, t_N$), . . . , where coordinate information (x, y, z) may be associated with a specific time-stamp $t_n$. In other words, the PRU (220) may report, and the LMF (215) may pass along, the time and location of itself during measurement.

At 240, the LMF (215) may provide, to the PRU (220), an indication of measurement reporting and provide priority information on the requested measurements. In other words, the LMF (215) may request specific PRU(s) (e.g. 220) to report CP measurements requested by the target UE (210) (indicated with, e.g., TRP ID, PRS resource set ID, PRS resource ID, TRP Tx TEG ID(s), etc.) and a specific set of time-stamps requested by the target UE (210) (e.g. $t_1, t_2, \ldots, t_N$)) (e.g. a set of single differential measurement for TRP-i and TRP-j from the PRU for the specified times). In an example embodiment, PRUs may report measurements quickly to minimize the latency between the time when the measurement is made at the PRU (220), and the time when the target UE (210) can receive/use it. For example the measurements may be reported without a scheduling request (e.g. using configured-grant PUSCH). Additionally or alternatively, a subset of the measurements may be reported, possibly before all the measurements have been made (e.g. measurements for a subset of the time-stamps). The LMF (215) may provide the PRU (220) with some time budget or constraints in the measurement request (240). The time budget may be determined based, at least partially, on a latency requirement and/or a PRS processing capability of the PRU (220).

At 245, the gNB (205) may perform PRS transmission to the target UE (210). At 250, the gNB (205) may perform PRS transmission to the PRU (220). The PRS transmissions 245, 250 may be performed with the same or different TRPs. The PRU (220) may perform measurement of the received PRS transmission 250. At 255, the PRU (220) may check if the current measurement is the same as the previously reported measurement(s).

If the measurement difference is over a threshold, at 260, the PRU (220) may report, to LMF (215), the requested measurement. In an example embodiment, the PRU(s) (220) may report CP measurements for the requested set of PRU measurements (indicated with, e.g., TRP ID, PRS resource set ID, PRS resource ID, TRP Tx TEG ID, etc.) and a specific set of time-stamps (e.g. $t_1, t_2, \ldots, t_N$)), and may also report the measuring PRU (220) location information at this set of time-stamps (e.g. for each $t_1, t_2, \ldots, t_N$)). In an example embodiment, the PRU (220) may not report the current measurement if it is the same as the previously reported measurement, or if the difference between the current measurement and the previously reported measurement is less than a certain threshold value, where the threshold value may be configured by/from the LMF (215). In an example embodiment, the PRU (220) may inform the LMF (215) that the previous measurements are the same as the current measurement. A technical effect of this may be to reduce overhead.

If the measurement difference is less than or equal to the threshold, at 265, the PRU (220) may request that the LMF (215) use the previous measurements as the requested measurements.

At 270, the LMF (215) may provide the requested PRU measurements to the target UE (210). In an example embodiment, the LMF (215) may broadcast/provide PRU-obtained CP measurements for the PRS, and the LMF (215) may indicate PRU ID(s) and the measurement(s) that are preferable to each target UE. In an example embodiment, the LMF (215) may provide the target UE (210) with information (e.g. PRU ID, CP measurements) for the requested measurements (indicated with, e.g., TRP ID, PRS resource set ID, PRS resource ID, TRP Tx TEG ID(s)) and the requested set of time-stamps (e.g. ($t_1, t_2, \ldots, t_N$)). In an example embodiment, the LMF (215) may also provide the location information of the PRU (220) at the time-stamps (e.g. ($t_1, t_2, \ldots, t_N$)). The target UE may need information on where the PRU (220) is at time $t_1, t_2, \ldots, t_N$. In an example embodiment, if the PRU (220) did not provide the requested measurements (e.g. via the LMF (215)), the target UE (210) may perform a single difference operation.

At 275, the target UE (210) may perform estimation of the target UE location. The estimation may be based, at least partially, on the received PRU measurements that correspond to at least some of the requests transmitted to the LMF (215). The received PRU (220) measurements may comprise single difference carrier phase measurements measured at the set of time-stamps. The estimation may be further based on measurement of the PRS performed by the target UE (210). The measurements performed by the target UE (210) may comprise single difference carrier phase measurements measured at the set of time-stamps. The measurements from the PRU (220) and the measurements from the target UE (210) may be for the same set of time-stamps. The estimation may comprise using double difference operation, as described above.

In an example embodiment, for UE-assisted positioning, the LMF (215) may request specific PRU(s) (e.g. 220) to report CP measurements for the set of requested measurements (indicated with, e.g., TRP ID, PRS resource set ID, PRS resource ID, TRP Tx TEG ID (s, etc.)) and a specific set of time-stamps (e.g. ($t_1, t_2, \ldots, t_N$)). The LMF (215) knows the latency requirement or urgency of the positioning service for the target UEs. For the requested measurements, the LMF (215) may indicate priority on the specific requested time-stamp(s), considering time-critical target UEs (e.g. 215).

In an example embodiment, UE-based CP positioning may be performed using sidelink (SL). NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink procedures may be configured to provide power savings in these vehicle-to-everything (V2X) and other use cases. Sidelink may be performed as a unicast, groupcast, multicast, and/or broadcast procedure.

In an example embodiment, a target UE may request that neighbor UE(s) provide information for double difference operation, such as a set of carrier phase measurements, and/or location information of neighbor UEs at specified times (e.g., coordinate of neighbor UEs at the requested time-stamp) in sidelink communication. For example, a neighbor UE may be requested to send at least one single difference carrier phase measurement directly to the target UE, rather than via an LMF. In an example embodiment, carrier phase measurements may include a set of TRP ID, PRS resource set ID, PRS resource ID, and/or TRP Tx TEG ID(s) measurements, which may be measured at a specific set of time-stamps, e.g., ($t_1, t_2, \ldots, t_N$). That is, the measurements may be requested to be performed and performed at time instances indicated by said set of time stamps. In an example embodiment, location information on the neighbor UE(s) may include information at a set of requested time-stamps, e.g. ($x_1, y_1, z_1, t_1$), ..., ($x_N, y_N, z_N, t_N$).... In an example embodiment, if the neighbor UE(s) has no information on the location, possibly because they are not able to estimate their own location, the neighbor UE(s) may inform the target UE that it cannot provide the location information. The target UE may request that the LMF provide information on their location at the set of requested, specific time-stamps, e.g. ($t_1, t_2, \ldots, t_N$). In an example embodiment, the target UE may be provided with the requested measurement and the location information about neighbor UEs, and the target UE may perform UE-based CP positioning based on the provided information.

A technical effect of example embodiments of the present disclosure may be to provide accuracy enhancement by effectively supporting CP positioning with double differential operation.

FIG. 3 illustrates the potential steps of an example method 300. The example method 300 may include: requesting at least one single difference carrier phase measurement of at least one positioning reference signal, wherein the at least one single difference carrier phase measurement is performed with at least one positioning reference unit, 310; transmitting an indication of a set of time-stamps for measurement of the at least one positioning reference signal, 320; receiving first measurement data for the at least one positioning reference signal, wherein the first measurement data comprises, at least, the at least one single difference carrier phase measurement measured with reference to the set of time-stamps, 330; and determining a location estimation of the apparatus, comprising performing a double differential operation based, at least partially, on the first measurement data and second measurement data, 340. At 310, the request may be configured to request that the at least one positioning reference unit perform CP measurement of the at least one positioning reference signal in order to produce the at least one single difference carrier phase measurement of the at least one positioning reference signal. At 330, the at least one single difference carrier phase measurement may correspond to the set of time-stamps. For example, the at least one single difference carrier phase measurement may be performed at one or more time instances indicated by the set of time-stamps. The example method 300 may be performed, for example, by a target UE.

FIG. 4 illustrates the potential steps of an example method 400. The example method 400 may include: receiving, from a target user equipment, a first request for at least one single difference carrier phase measurement of at least one positioning reference signal, wherein the first request is associated with at least one positioning reference unit, 410; receiving, from the target user equipment, a first indication of a set of time-stamps for measurement of the at least one positioning reference signal, 420; transmitting, to the at least one positioning reference unit, a second request for the at least one single difference carrier phase measurement of the at least one positioning reference signal with reference to the set of time-stamps, wherein the second request comprises a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier, 430; receiving, from the at least one positioning reference unit, at least one of: an indication to use previous measurements of the at least one positioning reference signal, or measurement data for the at least one positioning reference signal, wherein the measurement data comprises, at least, the at least one single difference carrier phase measurement measured with reference to the set of time-stamps, 440; and transmitting the at least one of the previous measurements and/or the measurement data to the target user equipment, 450. At 440, the at least one single difference carrier phase measurement may correspond to the set of time-stamps. For example, the at least one single difference carrier phase measurement may be performed at one or more time instances indicated by the set of time-stamps. The example method 400 may be performed, for example, by a LMF.

FIG. 5 illustrates the potential steps of an example method 500. The example method 500 may include: receiving a request for at least one single difference carrier phase measurement of at least one positioning reference signal, 510; receiving an indication of a set of time-stamps for the single difference carrier phase measurement of the at least one positioning reference signal, 520; performing measurement of the at least one positioning reference signal, with reference to the set of time-stamps, to determine single difference carrier phase measurement(s) of the at least one positioning reference signal based, at least partially, on the at least one requested single difference carrier phase measurement, 530; and transmit a message, wherein the transmitted message is based, at least partially, on the determined single difference carrier phase measurement(s) of the at least one positioning reference signal, 540. For example, at 530, the measurement may be performed at one or more time instances indicated by the set of time-stamps. The example method 500 may be performed, for example, by a target PRU, such as a reference UE.

In accordance with one example embodiment, an apparatus may comprise: at least one processor; and at least one memory including computer program code; the at least one memory and the computer program code configured to, with the at least one processor, cause the apparatus at least to: request at least one single difference carrier phase measurement of at least one positioning reference signal, wherein the at least one single difference carrier phase measurement may be performed with at least one positioning reference unit; transmit an indication of a set of time-stamps for measurement of the at least one positioning reference signal; receive first measurement data for the at least one positioning reference signal, wherein the first measurement data may comprise, at least, the at least one single difference carrier phase measurement measured with reference to the set of time-stamps; and determine a location estimation of the apparatus, which may comprise performing a double differential operation based, at least partially, on the first measurement data and second measurement data.

The example apparatus may be further configured to: request the at least one single difference carrier phase measurement from a location management function; transmit the indication of the set of time-stamps to the location management function; and receive the first measurement data from the location management function.

The example apparatus may be further configured to: measure the at least one positioning reference signal to determine the second measurement data, wherein the second measurement data may comprise, at least, at least one second single difference carrier phase measurement measured with reference to the set of time-stamps.

The request of the at least one single difference carrier phase measurement may comprise at least one of: an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier.

The example apparatus may be further configured to: select the at least one positioning reference unit based, at least partially, on a distance between the at least one positioning reference unit and the apparatus.

The first measurement data may further comprise at least one of: an indication of a location of the at least one positioning reference unit, or an identifier of the at least one positioning reference unit.

In accordance with one aspect, an example method may be provided comprising: requesting at least one single difference carrier phase measurement of at least one positioning reference signal, wherein the at least one single difference carrier phase measurement may be performed with at least one positioning reference unit; transmitting an indication of a set of time-stamps for measurement of the at least one positioning reference signal; receiving first measurement data for the at least one positioning reference signal, wherein the first measurement data may comprise, at least, the at least one single difference carrier phase measurement measured with reference to the set of time-stamps; and determining a location estimation of the apparatus, which may comprise performing a double differential operation based, at least partially, on the first measurement data and second measurement data.

In accordance with one example embodiment, an apparatus may comprise: circuitry configured to perform: request at least one single difference carrier phase measurement of at least one positioning reference signal, wherein the at least one single difference carrier phase measurement may be performed with at least one positioning reference unit; transmit an indication of a set of time-stamps for measurement of the at least one positioning reference signal; receive first measurement data for the at least one positioning reference signal, wherein the first measurement data may comprise, at least, the at least one single difference carrier phase measurement measured with reference to the set of time-stamps; and determine a location estimation of the apparatus, which may comprise performing a double differential operation based, at least partially, on the first measurement data and second measurement data.

In accordance with one example embodiment, an apparatus may comprise: processing circuitry; memory circuitry including computer program code, the memory circuitry and the computer program code configured to, with the processing circuitry, enable the apparatus to: request at least one single difference carrier phase measurement of at least one positioning reference signal, wherein the at least one single difference carrier phase measurement may be performed with at least one positioning reference unit; transmit an indication of a set of time-stamps for measurement of the at least one positioning reference signal; receive first measurement data for the at least one positioning reference signal, wherein the first measurement data may comprise, at least, the at least one single difference carrier phase measurement measured with reference to the set of time-stamps; and determine a location estimation of the apparatus, which may comprise performing a double differential operation based, at least partially, on the first measurement data and second measurement data.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: requesting at least one single difference carrier phase measurement of at least one positioning reference signal, wherein the at least one single difference carrier phase measurement may be performed with at least one positioning reference unit; transmitting an indication of a set of time-stamps for measurement of the at least one positioning reference signal; receiving first measurement data for the at least one positioning reference signal, wherein the first measurement data may comprise, at least, the at least one single difference carrier phase measurement measured with reference to the set of time-stamps; and determining a location estimation of the apparatus, which may comprise performing a double differential operation based, at least partially, on the first measurement data and second measurement data.

The means may be further configured to perform: requesting the at least one single difference carrier phase measurement from a location management function; transmitting the indication of the set of time-stamps to the location management function; and receiving the first measurement data from the location management function.

The means may be further configured to perform: measuring the at least one positioning reference signal to determine the second measurement data, wherein the second measurement data may comprise, at least, at least one second single difference carrier phase measurement measured with reference to the set of time-stamps.

The request of the at least one single difference carrier phase measurement may comprise at least one of: an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier.

The means may be further configured to perform: selecting the at least one positioning reference unit based, at least partially, on a distance between the at least one positioning reference unit and the apparatus.

The first measurement data may further comprise at least one of: an indication of a location of the at least one positioning reference unit, or an identifier of the at least one positioning reference unit.

In accordance with one example embodiment, a non-transitory computer-readable medium comprising program instructions stored thereon which, when executed with at least one processor, cause the at least one processor to: request at least one single difference carrier phase measurement of at least one positioning reference signal, wherein the at least one single difference carrier phase measurement is performed with at least one positioning reference unit; cause transmitting of an indication of a set of time-stamps for measurement of the at least one positioning reference signal; cause receiving of first measurement data for the at least one positioning reference signal, wherein the first measurement data comprises, at least, the at least one single difference carrier phase measurement measured with reference to the set of time-stamps; and determine a location estimation of the apparatus, comprising performing a double differential operation based, at least partially, on the first measurement data and second measurement data.

In accordance with another example embodiment, a non-transitory program storage device readable by a machine may be provided, tangibly embodying a program of instructions executable by the machine for performing operations, the operations comprising: request at least one single difference carrier phase measurement of at least one positioning reference signal, wherein the at least one single difference carrier phase measurement is performed with at least one positioning reference unit; cause transmitting of an indication of a set of time-stamps for measurement of the at least one positioning reference signal; cause receiving of first measurement data for the at least one positioning reference signal, wherein the first measurement data comprises, at least, the at least one single difference carrier phase measurement measured with reference to the set of time-stamps; and determine a location estimation of the apparatus, comprising performing a double differential operation based, at least partially, on the first measurement data and second measurement data.

In accordance with one example embodiment, an apparatus may comprise: at least one processor; and at least one memory including computer program code; the at least one memory and the computer program code configured to, with the at least one processor, cause the apparatus at least to: receive, from a target user equipment, a first request for at least one single difference carrier phase measurement of at least one positioning reference signal, wherein the first request may be associated with at least one positioning reference unit; receive, from the target user equipment, a first indication of a set of time-stamps for measurement of the at least one positioning reference signal; transmit, to the at least one positioning reference unit, a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receive, from the at least one positioning reference unit, at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and transmit the at least one of the previous measurements and/or the measurement data to the target user equipment.

In accordance with one aspect, an example method may be provided comprising: receiving, from a target user equipment, a first request for at least one single difference carrier phase measurement of at least one positioning reference signal, wherein the first request may be associated with at least one positioning reference unit; receiving, from the target user equipment, a first indication of a set of time-stamps for measurement of the at least one positioning reference signal; transmitting, to the at least one positioning reference unit, a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receiving, from the at least one positioning reference unit, at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and transmitting the at least one of the previous measurements and/or the measurement data to the target user equipment.

In accordance with one example embodiment, an apparatus may comprise: circuitry configured to perform: receive, from a target user equipment, a first request for at least one single difference carrier phase measurement of at least one positioning reference signal, wherein the first request may be associated with at least one positioning reference unit; receive, from the target user equipment, a first indication of a set of time-stamps for measurement of the at least one positioning reference signal; transmit, to the at least one positioning reference unit, a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receive, from the at least one positioning reference unit, at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and transmit the at least one of the previous measurements and/or the measurement data to the target user equipment.

In accordance with one example embodiment, an apparatus may comprise: processing circuitry; memory circuitry including computer program code, the memory circuitry and the computer program code configured to, with the processing circuitry, enable the apparatus to: receive, from a target user equipment, a first request for at least one single difference carrier phase measurement of at least one positioning reference signal, wherein the first request may be associated with at least one positioning reference unit; receive, from the target user equipment, a first indication of a set of time-stamps for measurement of the at least one positioning reference signal; transmit, to the at least one positioning reference unit, a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receive, from the at least one positioning reference unit, at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and transmit the at least one of the previous measurements and/or the measurement data to the target user equipment.

In accordance with one example embodiment, an apparatus may comprise means for performing: receiving, from a target user equipment, a first request for at least one single difference carrier phase measurement of at least one positioning reference signal, wherein the first request may be associated with at least one positioning reference unit; receiving, from the target user equipment, a first indication of a set of time-stamps for measurement of the at least one positioning reference signal; transmitting, to the at least one positioning reference unit, a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; receiving, from the at least one positioning reference unit, at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and transmitting the at least one of the previous measurements and/or the measurement data to the target user equipment.

In accordance with one example embodiment, a non-transitory computer-readable medium comprising program instructions stored thereon which, when executed with at least one processor, cause the at least one processor to: cause receiving, from a target user equipment, of a first request for at least one single difference carrier phase measurement of at least one positioning reference signal, wherein the first request may be associated with at least one positioning reference unit; cause receiving, from the target user equipment, of a first indication of a set of time-stamps for measurement of the at least one positioning reference signal; cause transmitting, to the at least one positioning reference unit, of a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; cause receiving, from the at least one positioning reference signal, of at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and cause transmitting of the at least one of the previous measurements and/or the measurement data to the target user equipment.

In accordance with another example embodiment, a non-transitory program storage device readable by a machine may be provided, tangibly embodying a program of instructions executable by the machine for performing operations, the operations comprising: cause receiving, from a target user equipment, of a first request for at least one single difference carrier phase measurement of at least one positioning reference signal, wherein the first request may be associated with at least one positioning reference unit; cause receiving, from the target user equipment, of a first indication of a set of time-stamps for measurement of the at least one positioning reference signal; cause transmitting, to the at least one positioning reference unit, of a second request for the at least one single difference carrier phase measurement of the at least one positioning reference signal with reference to the set of time-stamps, wherein the second request may comprise a second indication of the set of time-stamps and at least one of: a time budget for performing measurement, an identifier associated with the at least one positioning reference unit, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier; cause receiving, from the at least one positioning reference signal, of at least one of: an indication to use previous measurements of the at least one positioning reference signal, or measurement data for the at least one positioning reference signal, wherein the measurement data may comprise, at least, the at least one single difference carrier phase measurement measured with reference to the set of time-stamps; and cause transmitting of the at least one of the previous measurements and/or the measurement data to the target user equipment.

In accordance with one example embodiment, an apparatus may comprise: at least one processor; and at least one memory including computer program code; the at least one memory and the computer program code configured to, with the at least one processor, cause the apparatus at least to: receive a request for at least one single difference carrier phase measurement of at least one positioning reference signal; receive an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and transmit a message, wherein the transmitted message may be based, at least partially, on the determined single difference carrier phase measurement(s) of the at least one positioning reference signal.

The example apparatus may be further configured to: receive the request for the at least one single difference carrier phase measurement from a location management function; receive the indication of the set of time-stamps from the location management function; and transmit the message to at least one of the location management function or a target user equipment.

The example apparatus may be further configured to: compare the determined single difference carrier phase measurement(s) of the at least one positioning reference signal with a previous single difference carrier phase measurement of the at least one positioning reference signal to determine a difference between the determined single difference carrier phase measurement(s) and the previous single difference carrier phase measurement; where the difference is less than a threshold value, the transmitted message may comprise an indication to report the previous single difference carrier phase measurement; where the difference is equal to or greater than the threshold value, the transmitted message may comprise the determined single difference carrier phase measurement(s).

The example apparatus may be further configured to: receive the at least one positioning reference signal from a base station.

The request may comprise at least one of: a time budget for performing measurement, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier.

The transmitted message may comprise at least one of: an indication of a location of the apparatus, or an identifier of the apparatus.

In accordance with one aspect, an example method may be provided comprising: receiving a request for at least one single difference carrier phase measurement of at least one positioning reference signal; receiving an indication of a set of time-stamps for measurement of the at least one positioning reference signal; performing measurement of the at least one positioning reference signal, with reference to the set of time-stamps, to determine single difference carrier phase measurement(s) of the at least one positioning reference signal based, at least partially, on the at least one requested single difference carrier phase measurement; and transmitting a message, wherein the transmitted message may be based, at least partially, on the determined single difference carrier phase measurement (s) of the at least one positioning reference signal.

In accordance with one example embodiment, an apparatus may comprise: circuitry configured to perform: receive a request for at least one single difference carrier phase measurement of at least one positioning reference signal; receive an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and transmit a message, wherein the transmitted message may be based, at least partially, on the determined single difference carrier phase measurement(s) of the at least one positioning reference signal.

In accordance with one example embodiment, an apparatus may comprise: processing circuitry; memory circuitry including computer program code, the memory circuitry and the computer program code configured to, with the processing circuitry, enable the apparatus to: receive a request for at least one single difference carrier phase measurement of at least one positioning reference signal; receive an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and transmit a message, wherein the transmitted message may be based, at least partially, on the determined single difference carrier phase measurement(s) of the at least one positioning reference signal.

In accordance with one example embodiment, an apparatus may comprise means for performing: receiving a request for at least one single difference carrier phase measurement of at least one positioning reference signal; receiving an indication of a set of time-stamps for measurement of the at least one positioning reference signal; performing measurement of the at least one positioning reference signal, with reference to the set of time-stamps, to determine single difference carrier phase measurement(s) of the at least one positioning reference signal based, at least partially, on the at least one requested single difference carrier phase measurement; and transmitting a message, wherein the transmitted message may be based, at least partially, on the determined single difference carrier phase measurement(s) of the at least one positioning reference signal.

The means may be further configured to perform: receiving the request for the at least one single difference carrier phase measurement from a location management function; receiving the indication of the set of time-stamps from the location management function; and transmitting the message to at least one of the location management function or a target user equipment.

The means may be further configured to perform: comparing the determined single difference carrier phase measurement(s) of the at least one positioning reference signal with a previous single difference carrier phase measurement of the at least one positioning reference signal to determine a difference between the determined single difference carrier phase measurement(s) and the previous single difference carrier phase measurement; where the difference is less than a threshold value, the transmitted message may comprise an indication to report the previous single difference carrier phase measurement; where the difference is equal to or greater than the threshold value, the transmitted message may comprise the determined single difference carrier phase measurement(s).

The means may be further configured to perform: receive the at least one positioning reference signal from a base station.

The request may comprise at least one of: a time budget for performing measurement, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier.

The transmitted message may comprise at least one of: an indication of a location of the apparatus, or an identifier of the apparatus.

In accordance with one example embodiment, a non-transitory computer-readable medium comprising program instructions stored thereon which, when executed with at least one processor, cause the at least one processor to: cause receiving of a request for at least one single difference carrier phase measurement of at least one positioning reference signal; cause receiving of an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and cause transmitting of a message, wherein the transmitted message is based, at least partially, on the determined single difference carrier phase measurement(s) of the at least one positioning reference signal.

In accordance with another example embodiment, a non-transitory program storage device readable by a machine may be provided, tangibly embodying a program of instructions executable by the machine for performing operations, the operations comprising: cause receiving of a request for at least one single difference carrier phase measurement of at least one positioning reference signal; cause receiving of an indication of a set of time-stamps for the single difference carrier phase measurement of the at least one positioning reference signal; perform measurement of the at least one positioning reference signal, with reference to the set of time-stamps, to determine single difference carrier phase measurement(s) of the at least one positioning reference signal based, at least partially, on the at least one requested single difference carrier phase measurement; and cause transmitting of a message, wherein the transmitted message is based, at least partially, on the determined single difference carrier phase measurement (s) of the at least one positioning reference signal.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory including computer program code;
   the at least one memory and the computer program code configured to, with the at least one processor, cause the apparatus at least to:
   request at least one single difference carrier phase measurement of at least one positioning reference signal, wherein the at least one single difference carrier phase measurement is performed with at least one positioning reference unit;
   transmit an indication of a set of time-stamps for measurement of the at least one positioning reference signal;
   receive first measurement data for the at least one positioning reference signal, wherein the first measurement data comprises, at least, the at least one single difference carrier phase measurement measured with reference to the set of time-stamps; and
   determine a location estimation of the apparatus, comprising performing a double differential operation based, at least partially, on the first measurement data and second measurement data.

2. The apparatus of claim 1, wherein the at least one memory and the computer program code are configured to, with the at least one processor, cause the apparatus to:
   request the at least one single difference carrier phase measurement from a location management function;
   transmit the indication of the set of time-stamps to the location management function; and
   receive the first measurement data from the location management function.

3. The apparatus of claim 1, wherein the at least one memory and the computer program code are configured to, with the at least one processor, cause the apparatus to:
   measure the at least one positioning reference signal to determine the second measurement data, wherein the second measurement data comprises, at least, at least one second single difference carrier phase measurement measured with reference to the set of time-stamps.

4. The apparatus of claim 1, wherein the request of the at least one single difference carrier phase measurement comprises at least one of:
   an identifier associated with the at least one positioning reference unit,
   a transmission reception point transmission time error group identifier associated with the at least one positioning reference signal,
   a transmission reception point identifier associated with the at least one positioning reference signal,
   a resource set identifier associated with the at least one positioning reference signal,
   a resource identifier associated with the at least one positioning reference signal,
   an indication of a validity time for the at least one single difference carrier phase measurement,
   a priority associated with the transmission reception point identifier,
   a priority associated with the resource identifier associated with the at least one positioning reference signal, or
   a priority associated with the transmission reception point transmission time error group identifier.

5. The apparatus of claim 1, wherein the at least one memory and the computer program code are configured to, with the at least one processor, cause the apparatus to:
   select the at least one positioning reference unit based, at least partially, on a distance between the at least one positioning reference unit and the apparatus.

6. The apparatus of claim 1, wherein the first measurement data further comprises at least one of:
   an indication of a location of the at least one positioning reference unit, or
   an identifier of the at least one positioning reference unit.

7. An apparatus comprising:
   at least one processor; and
   at least one non-transitory memory including computer program code;
   the at least one memory and the computer program code configured to, with the at least one processor, cause the apparatus at least to:
   receive, from a target user equipment, a first request for at least one single difference carrier phase measurement of at least one positioning reference signal, wherein the first request is associated with at least one positioning reference unit;
   receive, from the target user equipment, a first indication of a set of time-stamps for measurement of the at least one positioning reference signal;
   transmit, to the at least one positioning reference unit, a second request for the at least one single difference carrier phase measurement of the at least one positioning reference signal with reference to the set of time-stamps, wherein the second request comprises a second indication of the set of time-stamps and at least one of:
   a time budget for performing measurement,
   an identifier associated with the at least one positioning reference unit,
   a transmission reception point transmission time error group identifier associated with the at least one positioning reference signal,
   a transmission reception point identifier associated with the at least one positioning reference signal,
   a resource set identifier associated with the at least one positioning reference signal,
   a resource identifier associated with the at least one positioning reference signal,
   an indication of a validity time for the at least one single difference carrier phase measurement,
   a priority associated with the transmission reception point identifier, a priority associated with the resource identifier associated with the at least one positioning reference signal, or a priority associated with the transmission reception point transmission time error group identifier;

receive, from the at least one positioning reference unit, at least one of:

an indication to use previous measurements of the at least one positioning reference signal, or measurement data for the at least one positioning reference signal, wherein the measurement data comprises, at least, the at least one single difference carrier phase measurement measured with reference to the set of time-stamps; and transmit the at least one of the previous measurements and/or the measurement data to the target user equipment.

8. An apparatus comprising:

at least one processor; and at least one non-transitory memory including computer program code;

the at least one memory and the computer program code configured to, with the at least one processor, cause the apparatus at least to:

receive a request for at least one single difference carrier phase measurement of at least one positioning reference signal;

receive an indication of a set of time-stamps for the single difference carrier phase measurement of the at least one positioning reference signal;

perform measurement of the at least one positioning reference signal, with reference to the set of time-stamps, to determine single difference carrier phase measurement(s) of the at least one positioning reference signal based, at least partially, on the at least one requested single difference carrier phase measurement; and transmit a message, wherein the transmitted message is based, at least partially, on the determined single difference carrier phase measurement(s) of the at least one positioning reference signal.

9. The apparatus of claim 8, wherein the at least one memory and the computer program code are configured to, with the at least one processor, cause the apparatus to:

receive the request for the at least one single difference carrier phase measurement from a location management function;

receive the indication of the set of time-stamps from the location management function; and transmit the message to at least one of the location management function or a target user equipment.

10. The apparatus of claim 8, wherein the at least one memory and the computer program code are configured to, with the at least one processor, cause the apparatus to:

compare the determined single difference carrier phase measurement(s) of the at least one positioning reference signal with a previous single difference carrier phase measurement of the at least one positioning reference signal to determine a difference between the determined single difference carrier phase measurement(s) and the previous single difference carrier phase measurement;

where the difference is less than a threshold value, the transmitted message comprises an indication to report the previous single difference carrier phase measurement;

where the difference is equal to or greater than the threshold value, the transmitted message comprises the determined single difference carrier phase measurement(s).

11. The apparatus of claim 8, wherein the at least one memory and the computer program code are configured to, with the at least one processor, cause the apparatus to:

receive the at least one positioning reference signal from a base station.

12. The apparatus of claim 8, wherein the request comprises at least one of:

a time budget for performing measurement, a transmission reception point transmission time error group identifier associated with the at least one positioning reference signal, a transmission reception point identifier associated with the at least one positioning reference signal, a resource set identifier associated with the at least one positioning reference signal, a resource identifier associated with the at least one positioning reference signal, an indication of a validity time for the at least one single difference carrier phase measurement, a priority associated with the transmission reception point identifier, a priority associated with the resource identifier associated with the at least one positioning reference signal, or a priority associated with the transmission reception point transmission time error group identifier.

13. The apparatus of claim 8, wherein the transmitted message comprises at least one of:

an indication of a location of the apparatus, or an identifier of the apparatus.

* * * * *